UNITED STATES PATENT OFFICE.

MARCELLUS E. SPOFFORD, OF KEENE, NEW HAMPSHIRE.

COMPOSITION FOR LINING BARRELS.

SPECIFICATION forming part of Letters Patent No. 437,258, dated September 30, 1890.

Application filed May 26, 1890. Serial No. 353,245. (No specimens.)

*To all whom it may concern:*

Be it known that I, MARCELLUS E. SPOFFORD, a citizen of the United States, residing at Keene, in the county of Cheshire and State of New Hampshire, have invented certain new and useful Improvements in a Composition for Lining Barrels and the Art of Preparing the Same; and I do hereby declare the following to be a full, clear, and exact description of the invention, such as will enable others skilled in the art to which it appertains to make and use the same.

The object of the invention is to provide a cheap and efficient lining for oil-barrels and similar vessels; and it consists in the improved composition hereinafter described, and pointed out in the claims.

In preparing the composition a lye is made from ashes (preferably of hard wood) and rain-water. The leach tub or barrel is first filled about half-full of pine boughs, the extreme ends of the boughs filled with needles being preferred. Upon these the ashes are placed and packed together, and water at a temperature of 212° Fahrenheit caused to leach through them and through the boughs. The lye will dissolve the resin and the essential oil from the boughs and the resulting liquor is thereupon reduced to a specific gravity of about 1,050° by the addition of more water. To one gallon of this liquid is added one and one-half pound of glue. For this a cheap quality or what is called the "third run" will suffice. To this, after it has stood about an hour, is added three-fourths of a pound of molasses. To two gallons of the lye first made, is then added one half pound of potato-starch, and the mixture is heated until it thickens, whereupon the two fluid preparations are mixed, and they form a composition that can be applied with a brush and which will resist the action of kerosene-oil and its constituents.

Some of the advantages of my composition are independent of the particular method of leaching pine boughs, and it would not be an entire departure from the invention were the resinous essential oil omitted, or a hard resin or pitch substituted therefor, and particularly so far as concerns the use of starch in and for the purpose set forth.

Glue, molasses, and alkalies have heretofore been used in various mixtures or compositions for lining barrels, and such matters are not broadly claimed herein.

Having thus described my invention, what I desire to secure by Letters Patent is—

1. The herein-described composition for lining barrels and other vessels, consisting of the following substances in about the proportions named, to wit: one gallon of the wood-ash lye containing a quantity of essential oil and resin, one and one-half pound of glue, three-fourths of a pound of molasses, and one-half pound of starch, substantially as set forth.

2. The hereinbefore-described composition for lining barrels, consisting of the following substances mingled in about the proportions named, to wit: one gallon of wood-ash lye, one and one-half pound of glue, three-fourths of a pound of molasses, and one-half pound of starch, substantially as set forth.

In testimony whereof I have affixed my signature in presence of two witnesses.

MARCELLUS E. SPOFFORD.

Witnesses:
CHARLES H. HENRY,
LEWIS W. HOLMES.